United States Patent [19]
Walton

[11] 4,260,267
[45] Apr. 7, 1981

[54] POWER DRIVEN FLUID DISPLACEMENT APPARATUS

[76] Inventor: Arthur Walton, 517 W. 17 St., Long Beach, Calif. 90813

[21] Appl. No.: 63,174

[22] Filed: Aug. 3, 1979

[51] Int. Cl.³ .............................................. B01F 7/16
[52] U.S. Cl. .................................... 366/343; 366/129; 366/329
[58] Field of Search ............... 366/129, 343, 312, 327, 366/329, 605

[56] References Cited
U.S. PATENT DOCUMENTS

| | | | |
|---|---|---|---|
| 2,231,926 | 2/1941 | Leighty | 366/343 |
| 2,501,016 | 3/1950 | Woodman | 366/605 X |
| 2,964,301 | 12/1960 | Bosse | 366/329 |
| 3,333,831 | 8/1967 | Chapman | 366/129 |
| 4,054,272 | 10/1977 | Cooke | 366/343 |

*Primary Examiner*—Philip R. Coe
*Attorney, Agent, or Firm*—Geoffrey R. Myers; Darle M. Short

[57] ABSTRACT

The improved apparatus has, in combination with a relatively long shaft and a two-blade propeller means fixed at one end thereof, a kicker bar in the form of a flat longitudinal bar also fixed to the same end of the shaft and disposed perpendicularly thereto. The bar protrudes outwardly from both sides of the shaft a distance that is preferably no greater than the distance the propeller means protrudes outwardly from the shaft.

2 Claims, 4 Drawing Figures

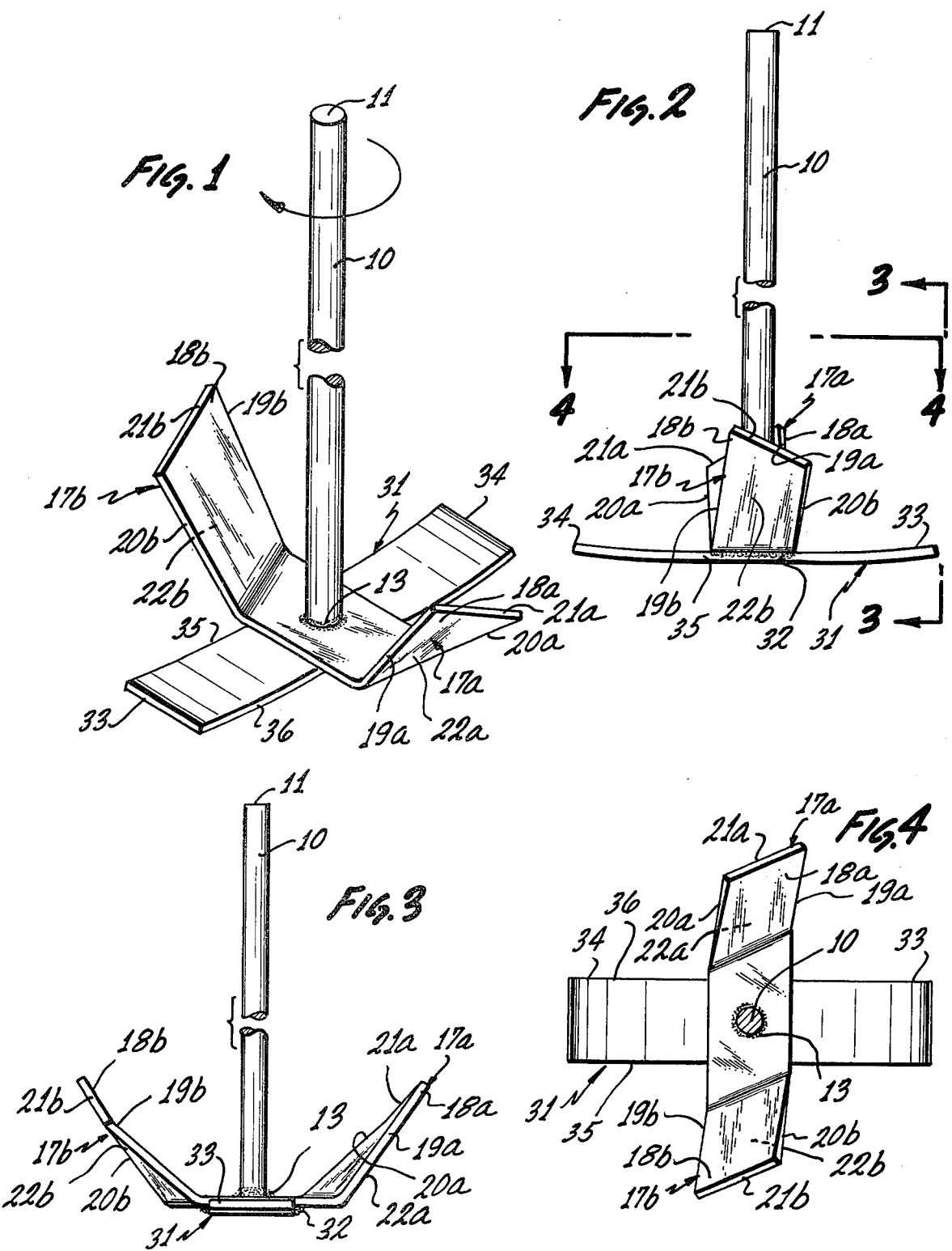

POWER DRIVEN FLUID DISPLACEMENT APPARATUS

FIELD OF THE INVENTION

This invention relates to a power driven fluid displacement apparatus and, more particularly, to such apparatus that can be driven by a standard hand held electric motor or drill.

BACKGROUND OF THE INVENTION

U.S. Pat. No. 3,333,831 teaches a power driven fluid displacement apparatus which has an electric drill driving a mixer attachment which is attached to the clutch of the drill by a long shaft. The mixer attachment is intended to be downwardly inserted into a container or barrel holding the medium to be mixed. Two blades are disposed on the end of the shaft, 180° apart. Each blade has an outer pushing part having leading and trailing edges bent upwardly or away from the part towards the shaft. The blades are twisted so that the leading edge is higher than the trailing edge. Thus, when the shaft is rotated in a given direction, an axial downward force is produced because the fluid is pushed downwardly away from the shaft. Obviously this force can be sufficient to support the weight of an electric drill, making mixing a somewhat relaxing process. However, because of the upwardly bent blades, one finds it difficult to agitate the fluid medium which has settled at the lower circumferential corner of the container.

OBJECTS OF THE INVENTION

An object of this invention is to provide a more efficient power driven fluid displacement apparatus.

Another object of this invention is to provide an improved apparatus of the type described wherein a pair of kicker blades is disposed on the respective end of the shaft which blades are substantially perpendicular to the shaft.

These and other objects and features of advantage will become more apparent after studying the following detailed description of the preferred embodiment of the invention, together with the appended drawing.

BRIEF DESCRIPTION OF THE DRAWING

FIG. 1 is a pictorial view of the improved apparatus incorporating my invention.

FIG. 2 is an elevation of the apparatus looking directly into one of the prior art bent blades of the apparatus.

FIG. 3 is an elevation taken on line 3—3 of FIG. 2 in the direction of the arrows and in an enlarged scale.

FIG. 4 is a plan taken on line 4—4 of FIG. 2, also in the direction of the arrows.

DETAILED DESCRIPTION OF THE DRAWING

As in the above mentioned U.S. Patent, the apparatus has a shaft 10 which is normally vertically disposed. One end 11 of the shaft is free and is adapted to be engaged by a clutch of the electric drill (not shown). The other end of the shaft 10 is provided with a blade having two parts, blades 17a and 17b. The shaft 10 is suitably welded to the blades 17a and 17b by a weld 13. Each blade 17a and 17b has an outer pushing part 18a and 18b, respectively, provided with a leading and trailing edge 19a and 20a in care of the first pushing surface or portion 18a, and 19b and 20b in care of another pushing surface or portion 18b. The leading and trailing edges 19a and 20a are connected by an outer tip edge 21a and the leading and trailing edges 19b and 20b are connected by an outer tip edge 21b. Each pushing part 18a and 18b has a bottom or rear pushing surface 22a and 22b, respectively.

As taught in the prior art patent, the shaft is suitably rotated in the direction of arrow shown in FIG. 1. Each part 18a and 18b is bent upwardly along bent lines, which are parallel to each other, but angularly related to the edges of the blade forming blades 17a and 17b. The portion of this invention described in detail up to this point is what is disclosed by the prior art and produces an apparatus which can be used to mix fluids relatively well.

However, because of the angular position of blades 17a and 17b, with respect to the shaft, I have discovered that the apparatus is unable to stir the medium that happens to be settled against the side walls and bottom of the respective container, especially if the container has a bottom that is perpendicular to the side walls forming a corner. Therefore, I have added a second blade in the form of a bar 31 to the underside of the prior art blade 17, which bar is welded thereto by weld beads 32. Bar 31 has ends 33 and 34 and parallel side edges 35 and 36. Note that bar 31 is not twisted about is longitudinal axis, nor does it have a pitch. The respective ends 33 and 34 are displaced from the shaft 10 about the same distance that the ends 21a and 22b are displaced from the shaft. This allows the respective ends 33 and 34 to penetrate the corner formed by the wall and bottom of a container (not shown) and disturb the material which has settled therein. Preferably, the bar 31 is bent slightly, as shown in the drawing, to aid in the mixing.

Having described the preferred embodiment of my invention, one skilled in the art, after studying the disclosed embodiment, could use other embodiments without departing from the spirit of my invention. Therefore, my invention is not to be considered as limited to the disclosed embodiment, but includes all embodiments falling within the scope of the appended claims.

I claim:

1. In a power driven fluid displacement apparatus comprising:

a longitudinal shaft having a first and second end, said first end adapted to be rotatively effectively driven by a driving motor, said longitudinal shaft being provided with projecting blades including at least a first blade portion positioned on one side of said longitudinal shaft and a second blade portion positioned on the other side thereof in symmetrically balanced relationship and with each of said first and second blade portions having an outer pushing part provided with a leading edge and a trailing edge and an outer tip edge interconnecting said leading and trailing edges and being deflected axially forwardly from a true transverse plane perpendicular to said longitudinal shaft and twisted so as to have said leading edge positioned along an outwardly and axially forwardly inclined edge line axially forwardly displaced from a similar outwardly and axially forwardly inclined edge line coincident with the corresponding trailing edge;

each of said pushing parts having a rear pushing surface inclined axially forwardly and rotatively forwardly in the direction of rotation toward said leading edge and inclined axially forwardly and outwardly in a radial direction away from said longitudinal shaft, said projecting blades being fixedly attached to the second end of said longitudinal shaft, the improvement comprising:

a bar fixedly attached to the bottom of said projecting blades, said bar having longitudinally untwisted top and bottom surfaces and a first and a second pair of edges, said second pair of edges being longer than the first pair of edges, said bar being attached to said projecting blades such that the center of said projecting blades is directly over the center of said bar, wherein the top surface of said bar abuts said projecting blades, said second pair of edges being defined by parallel vertical planes, said first pair of edges defining free ends of said bar.

2. The power driven fluid displacement apparatus as defined in claim 1 wherein the free ends of said bar are bent slightly upwards.

* * * * *